April 17, 1956 L. O. FRENCH 2,742,026
ROTARY VALVE INTERNAL-COMBUSTION ENGINE
Original Filed June 4, 1952
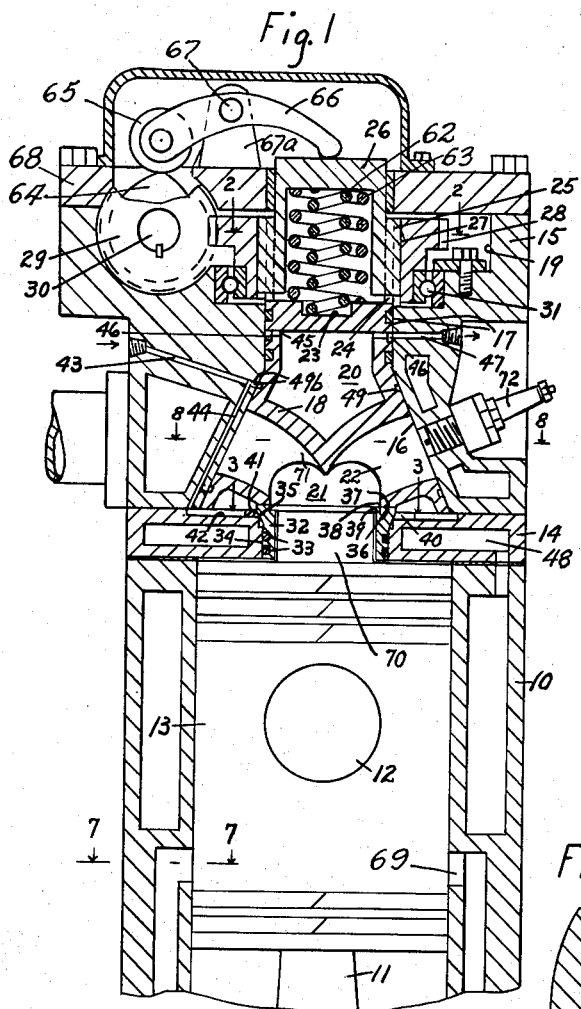
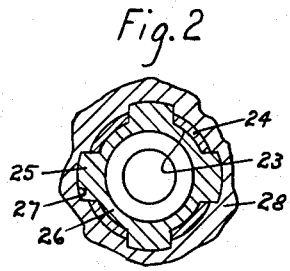
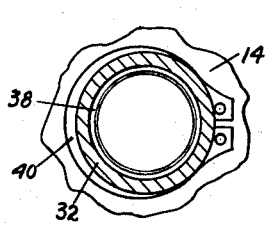
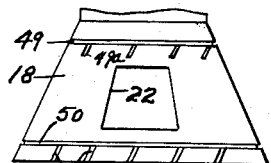
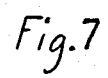
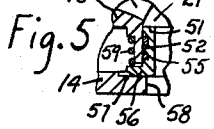
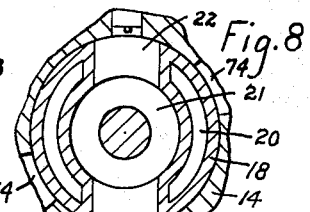
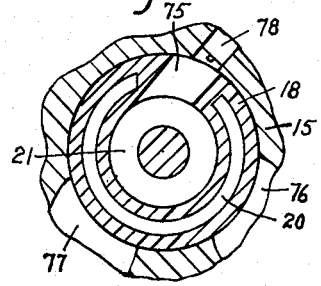
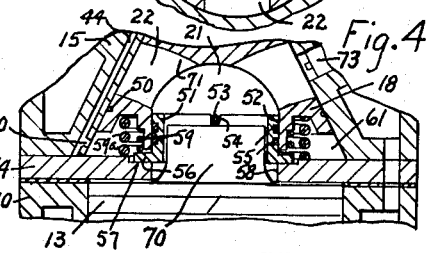
INVENTOR.
Louis O. French

United States Patent Office 2,742,026
Patented Apr. 17, 1956

2,742,026
ROTARY VALVE INTERNAL-COMBUSTION ENGINE

Louis O. French, Milwaukee, Wis.

Original application June 4, 1952, Serial No. 291,729, now Patent No. 2,730,089, dated January 10, 1956. Divided and this application June 27, 1955, Serial No. 518,299

1 Claim. (Cl. 123—41.4)

The invention relates to internal combustion engines and more particularly to rotary valve internal combustion engines having a rotary valve of the plug, usually frusto-conical, type.

This case is a divisional of my copending application Serial No. 291,729, filed June 4, 1952, now Patent No. 2,730,089, issued January 10, 1956, as to the means for masking or sealing off the desired area of the lower face of the valve, which means will readily compensate for wear and which is both cooled and lubricated by the valve lubricant and is provided with self-centering sealing surfaces.

A further object of the invention is to provide an improved form of rotary valve for internal combustion engines.

The invention further consists in the several features hereinafter set forth and more particularly defined by claim at the conclusion hereof.

In the drawings:

Fig. 1 is a vertical sectional view through an engine embodying the invention, parts being broken away;

Fig. 2 is a detailed horizontal sectional view taken on the line 2—2 of Fig. 1, parts being broken away;

Fig. 3 is a detailed horizontal sectional view taken on the line 3—3 of Fig. 1;

Fig. 4 is a view similar to Fig. 1 showing certain modifications, parts being broken away;

Fig. 5 is a detailed vertical sectional view showing certain modifications of parts shown in Fig. 4;

Fig. 6 is a side elevation view of the head end of the valve;

Fig. 7 is a fragmentary horizontal sectional view taken on the line 7—7 of Fig. 1;

Fig. 8 is a horizontal sectional view taken on the line 8—8 of Fig. 1, parts being broken away;

Fig. 9 is a view similar to Fig. 8 showing a modification, parts being broken away.

The engine includes the cylinder 10 which may be integral with or secured to the usual crankcase (not shown) having the usual crankshaft (not shown) operatively connected by a connecting rod 11 and piston pin 12 to the piston 13 working in the cylinder 10 whose head end is formed by head members 14 and 15.

The head member 15 is provided with a centrally disposed bore having a conical lower end 16 and a cylindrical upper end 17. A rotary valve 18 having a frusto-conical head to fit the bore 16 and a cylindrical stem to fit the bore 17 extends up into a recess 19. The head of the valve and a portion of the stem are hollow to form a cavity 20 which surrounds the interior chamber 21 and the ports 22 in the valve and extends down to the lower face or end of the valve whose diameter is in most instances substantially equal to the diameter of the bore of the cylinder 11.

The upper end of the stem is provided with a bore 23 and radially disposed arcuate jaws 24 which slidably interfit with radially disposed keys 25 on a tubular coupling member 26 whose keys also slidably interfit with keyways or internal splines 27 in the hub of a gear 28 which meshes with and is driven at one-half engine speed by a gear 29 keyed to an overhead shaft 30 that may be driven by gearing or chains and gears or in other suitable and well-known manner from and at the same speed as the crankshaft. The gear 28 is journalled in a ball bearing journal 31 whose outer race is mounted and secured in the bottom portion of the recess 19.

Several forms of means for masking off substantially seventy per cent or more of the lower face area of the valve ordinarily exposed to gas pressures in the cylinder 10 have been shown in Figs. 1, 3, 4, and 5.

In Figs. 1 and 3 the masking means includes a sealing sleeve or tube 32 having a portion provided with sealing rings 33 which slidably engage a bore 34 in the head member 14, an annular wedge surface portion 35, a top portion 36 in bearing engagement with a seat 37 at the lower end of the valve directly surrounding the opening 38 to the chamber 21, and a differential pressure area recess 39. It also includes a resilient split retainer ring 40 having a wedge face 41 engageable with the wedge surface 35. The ring 40 rests on the bottom of a recess 42 in the top face of the head member 14 and because of its resiliency and size dimensions is capable of contracting about the tube 32 and exerting force thereon to produce an upward lifting component on the tube 32 to bring its top portion 36 into and maintain it in operative self-centering contact with the seat 37. This contact pressure may vary with the size dimensions of the ring and the resiliency of the metal of which it is made. As shown, the ring 40 is strong enough to sustain the weight of the valve and hold said valve in operative rotating contact with the head member 14 with the valve in rotating sealed contact with the ring. If desired, a separate spring usually associated with the stem portion of the valve may counteract the weight of the valve and hold it in operative position, in which instance the ring 40 need only be strong enough to maintain a bearing contact between the surfaces 36 and 37, it being noted that the valve preferably rotates on the tube 32 which has only a longitudinal movement to take care of any wear between the surfaces 36 and 37.

The head 14 has a passage 43 connected to any suitable circulatory supply of lubricant under pressure and connected by a passage 44 with recess 42 with which the portion of the cavity 20 at the lower open end of the valve connects. The upper end of the cavity 20 connects by one or more ports 45 with an annular groove 46 which connects through a passage 47 with a lubricant return (not shown) so that the lubricant is continuously circulated through the valve body to cool it and so that some of this lubricant will lubricate the surfaces 36 and 37 and also the bore 34 which in this instance may be cooled by the water jacket space 48. The conical surface of the valve 18 may be supplied with a film of lubricant in any suitable manner, and for this purpose I have shown annular grooves 49 and 50. The groove 49 is provided with spaced distributor grooves 49a and connects through a port 49b with the passage 43 while the groove 50 is provided with a series of circumferentially spaced grooves 50a inclined in the direction of rotation of the valve indicated by the arrow in Fig. 6 and extending to the lower face of the valve so that these grooves act as scoops to carry lubricant from the recess 42 up into the groove 50 and also distribute it on the surface of the valve below this groove.

Figs. 4 and 5 show the preferred form of masking means which includes a sealing sleeve or tube 51 which is mounted to slide in a bore 52 of a tubular opening to the chamber 21, is keyed against rotation relative to the valve by a pin 53 on the valve disposed in a slot 54 in the tube, is provided with sealing rings 55 engaging the bore 52 and has an outwardly extending sealing flange 56 which seats and rotates on a seat 57 in the head member 14 which in this instance is a plate provided with a bore 58, said sleeve being normally held in running engagement with the seat 57 by a spring 59. The flange 56 has self-centering contact with the seat 57. A spring 59a interposed between the lower end of the valve and the member 14 holds the valve itself in operative running engagement with the head 15. The lubrication passage 44 connects through a port 60 with a space 61 which communicates with the cavity 20 in the valve shown in Fig. 1, it being noted that passages in this cavity in the region of the ports connect with the lower open end of the masked portion of the valve so that lubricant circulated through the space 61 cools the head 14, the sleeve 51 and the lower end of the valve and also lubricates the flange 56, seat 57, and the bore 58.

In Fig. 4 equal areas at the top and bottom of the tube 51 are exposed to cylinder gases so that the pressure to hold the flange 56 in rotating sealing contact with the seat 57 is provided by the spring 59 exerting a constant pressure thereon. If a variable sealing pressure is desired, then as shown in Fig. 5, the opening 58 in part 14 may be of smaller diameter so that less area of the bottom of the sleeve is exposed to gas pressures in the cylinder so that the varying cylinder gas pressures acting on the unbalanced portion of the top of the sleeve will act in conjunction with the spring 59 to hold the sleeve in operative rotating sealing engagement with the head.

Where the area of the lower end of the valve is substantially equal to the area of the cylinder bore and the effective opening to the chamber 21 is at least equal to the combined areas of the ports 22 or to a single port, if used, then the sealing means, such as the tube 32 or 51, is effective to seal off seventy per cent to seventy-five per cent or the major portion of the lower end of the valve since under these conditions the area of the bore 34 or the opening 52 will then be not more than thirty to twenty-five per cent of the area of the lower end of the valve so that the gases in the cylinder can only act on this area.

Where the valve 18 must be turned on its seat against the loading effect of gas pressures on its unmasked area, even these pressures may produce wear on the valve or its seat, and the amount of lubricant required as a lubricant and seal may be high and thus increase the operating expenses.

To counteract pressures acting on this area, I have provided spring means shown as springs 62 and 63 interposed between the stem of the valve 18 and the top of a bore in the coupling 26 and engine driven means for loading these springs in predetermined amounts during the engine's cycle, here shown as a cam 64 connected either to the gear 29 or its drive shaft 30 and engaged by a roller 65 on one end of a rocker lever 66 pivotally mounted at 67 on a bracket 67a integral with or secured to a top plate 68 and engaging at its other end with the top of the coupling 26, the spring 62 which seats in the recess at the lower end of the bore 25 being initially loaded to maintain said roller in contact with said cam. The spring 63 is a heavier spring and does not normally engage the top of the coupling but comes into action during the high pressure periods of the engine's cycle.

The contour of the cam 64 determines the amount of counteracting spring load and its angular position on its driver and its length determine the time and cyclic duration of its action. Compression ignition engines usually are run on a 15 to 17 to 1 or higher compression ratio, the compression pressure ranging from about 500 to 550 pounds per square inch, and the peak pressures ranging from 600 to 900 pounds per square inch. For such engines, the cam 64 may, for example, be designed to become effective when the compression pressure reaches 250 to 300 pounds per square inch or when the piston reaches forty-five below top dead center (TDC) and be gradually increased to keep the pressures on the valve at 250 to 300 pounds per square inch or lower, if desired, until ten degrees before T D C or during the period of peak pressure and then be more sharply increased to a maximum predetermined counter-loading that continues until ten or fifteen degrees after T D C or until the peak has passed and then be gradually decreased to a zero effective loading at forty-five degrees after T D C or such time thereafter as may be found desirable, it being noted that the timing, extent of loading, and duration of loading of the counter-pressure spring will depend upon the compression pressures used and the peculiarities of the combustion process of the design of compression ignition or petrol engine on which the valve is used.

The engine shown in Fig. 1 is a two cycle engine in which scavenging air (if a compression ignition engine) or a fuel mixture (if a petrol engine) received from a blower or as shown compressed in the crankcase of the engine enters the cylinder 10 through tangentially inclined ports 69 controlled by the piston which at the end of compression has only a working clearance with the head end of the cylinder and has a tubular projection 70 with only a small clearance between it and the tube 32 or 51 so that the chamber 21 with the ports 22 form substantially the entire clearance volume. The swirl of the scavenging medium is in a direction opposite to the rotation of the valve 18 to promote active turbulence which is further augmented by forming the upper parts 71 of the ports so that they extend above the top of the chamber 21 and act as fan blades. In Fig. 1 I have shown a spark plug 72 for igniting the explosive charge while in Fig. 4 I have indicated a fuel injector 73 by which fuel near the end of the compression stroke is sprayed into the chamber 21 then charged with air at compression ignition pressure. As the valve 18 rotates its ports 22 cooperate with exhaust ports 74 in the head 15, these ports opening before the piston 13 on its down stroke uncovers the ports 69 and remaining open until or slightly before said ports 69 are lapped by the piston on its upstroke.

In Fig. 9 I have shown the valve 18 as provided with a single port 75 adapted for four cycle operation to cooperate with an inlet port 76 and an exhaust port 77 in the head member 15. The port 75 is preferably tangentially inclined to create a swirl of either air for a compression ignition engine or fuel mixture for a petrol engine and the numeral 78 indicates either a spark plug or a fuel injector depending upon the fuel and the compression pressure used. With a single port opening, the valve is driven at one-half engine speed as in the first described construction for four cycle operation.

I desire it to be understood that this invention is not to be limited to any particular form or arrangement of parts except in so far as such limitations are included in the claim.

What I claim as my invention is:

In an internal combustion engine, the combination of a cylinder having a head end, a piston reciprocally mounted in the cylinder, a plug type rotary valve member operatively mounted in the head end of the cylinder and having a tapered side wall head provided with a combustion chamber having an opening at its bottom end communicating with the cylinder and having a port extending through its side wall and a coolant space between said side walls, combustion chamber, and port and opening into the bottom end of said valve member, a port in the head end of said cylinder cooperating with the port in said valve member, means for rotating said valve, said head end including a part overlying a portion of the bottom of said valve member including said coolant space and forming a wall of said space and provided with a combustion chamber opening alined with the opening in the bottom end of said valve member, sealing means between said alined openings including a sleeve member capable of longitudinal movement and having sealing engagement respectively with said valve member and said overlying head end part and forming a wall of said coolant space, and means for circulating a lubricant through said coolant space formed by the valve, head part and sleeve member to cool the valve member, the part of said head overlying the lower end of the valve, and said sleeve member and lubricate the sealing surfaces of said sleeve member.

No references cited.